US009519875B2

(12) United States Patent
Lamprecht

(10) Patent No.: US 9,519,875 B2
(45) Date of Patent: Dec. 13, 2016

(54) METHOD FOR DETERMINING AN EXPECTED CONSUMPTION VALUE OF A MOTOR VEHICLE

(71) Applicant: Audi AG, Ingolstadt (DE)

(72) Inventor: Andreas Lamprecht, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 54 days.

(21) Appl. No.: 14/380,884

(22) PCT Filed: Mar. 14, 2013

(86) PCT No.: PCT/EP2013/000789
§ 371 (c)(1),
(2) Date: Aug. 25, 2014

(87) PCT Pub. No.: WO2013/159853
PCT Pub. Date: Oct. 31, 2013

(65) Prior Publication Data
US 2015/0019118 A1 Jan. 15, 2015

(30) Foreign Application Priority Data

Apr. 28, 2012 (DE) .......................... 10 2012 008 688

(51) Int. Cl.
*G06Q 10/06* (2012.01)
*G06Q 10/04* (2012.01)
(Continued)

(52) U.S. Cl.
CPC .............. *G06Q 10/04* (2013.01); *G06Q 10/06* (2013.01); *G06Q 50/30* (2013.01); *G07C 5/008* (2013.01); *G07C 5/085* (2013.01)

(58) Field of Classification Search
CPC ........ G06Q 10/04; G06Q 10/06; G06Q 50/30; G07C 5/085; G07C 5/008
(Continued)

(56) References Cited

U.S. PATENT DOCUMENTS 5,913,917 A 6/1999 Murphy
6,484,088 B1 * 11/2002 Reimer ................. G01F 23/296
340/450.2
(Continued)

FOREIGN PATENT DOCUMENTS

WO WO 2008/141646 11/2008

OTHER PUBLICATIONS

International Search Report issued by the European Patent Office in International Application PCT/EP2013/000789 on Jun. 14, 2013.

*Primary Examiner* — Atul Trivedi
(74) *Attorney, Agent, or Firm* — Henry M. Feiereisen LLC.

(57) ABSTRACT

A method for determining an expected consumption value of a motor vehicle for a predetermined driving situation—includes detecting actual consumption values and storing these values upon each occurrence of the predetermined driving situation, and further estimating the expected consumption value on the basis of the stored consumption values. Furthermore, a check is made whether the expected consumption value satisfies a predetermined significance criterion. If this is the case, the expected consumption value is used for a range determination for the motor vehicle; if this is not the case, an estimated value for the expected consumption is determined and used for range determination for the motor vehicle.

5 Claims, 2 Drawing Sheets

(51) Int. Cl.
*G06Q 50/30* (2012.01)
*G07C 5/00* (2006.01)
*G07C 5/08* (2006.01)

(58) Field of Classification Search
USPC .......................................................... 701/123
See application file for complete search history.

(56) References Cited

U.S. PATENT DOCUMENTS

| | | | | |
|---|---|---|---|---|
| 6,594,579 B1* | 7/2003 | Lowrey | ................ | G08G 1/20 340/439 |
| 7,925,426 B2* | 4/2011 | Koebler | ................ | B60L 3/12 180/65.26 |
| 8,036,929 B1* | 10/2011 | Reisman | ................ | G06Q 30/02 705/7.29 |
| 8,340,884 B1* | 12/2012 | He | ................ | B60W 30/18072 340/439 |
| 8,340,925 B2* | 12/2012 | Higgins | ................ | G01F 9/001 701/123 |
| 8,781,740 B2* | 7/2014 | Ichikawa | ................ | G07C 5/085 377/24.1 |
| 8,849,555 B2* | 9/2014 | Scofield | ................ | B60R 16/0232 340/450.2 |
| 8,874,477 B2* | 10/2014 | Hoffberg | ................ | G06Q 10/0631 705/37 |
| 8,972,161 B1* | 3/2015 | Koebler | ................ | G01C 21/3469 340/995.27 |
| 2003/0069684 A1* | 4/2003 | Reimer | ................ | B60K 15/077 701/123 |
| 2005/0021222 A1* | 1/2005 | Minami | ................ | G07C 5/0858 701/123 |
| 2007/0129878 A1* | 6/2007 | Pepper | ................ | B60W 40/12 701/123 |
| 2007/0256481 A1* | 11/2007 | Nishiyama | ................ | G01F 9/02 73/114.52 |
| 2007/0276582 A1* | 11/2007 | Coughlin | ................ | B60W 40/09 701/123 |
| 2008/0133120 A1* | 6/2008 | Romanick | ................ | G01C 21/3469 701/123 |
| 2010/0109856 A1* | 5/2010 | Kuenzner | ................ | G07C 5/004 340/439 |
| 2011/0034176 A1* | 2/2011 | Lord | ................ | G06F 17/30244 455/450 |
| 2011/0071712 A1* | 3/2011 | Mizuno | ................ | B60K 6/46 701/22 |
| 2011/0125357 A1* | 5/2011 | Harumoto | ................ | B60K 6/48 701/22 |
| 2011/0160990 A1* | 6/2011 | Mineta | ................ | G01C 21/3469 701/123 |
| 2011/0184642 A1* | 7/2011 | Rotz | ................ | G01C 21/3492 701/533 |
| 2011/0196817 A1* | 8/2011 | Pryakhin | ................ | G01C 21/26 706/14 |
| 2011/0213517 A1* | 9/2011 | Laws | ................ | B60W 10/26 701/22 |
| 2011/0258044 A1 | 10/2011 | Kargupta | | |
| 2011/0279255 A1* | 11/2011 | Miyoshi | ................ | G01C 21/3469 340/441 |
| 2011/0288738 A1* | 11/2011 | Donnelly | ................ | F02D 19/0697 701/99 |
| 2011/0313646 A1 | 12/2011 | Kancharla et al. | | |
| 2011/0313647 A1* | 12/2011 | Koebler | ................ | B60L 15/2045 701/123 |
| 2012/0029803 A1 | 2/2012 | Yasushi et al. | | |
| 2013/0046449 A1* | 2/2013 | Yucel | ................ | F16H 61/0213 701/51 |
| 2013/0046466 A1* | 2/2013 | Yucel | ................ | G01C 21/3469 701/538 |
| 2013/0046526 A1* | 2/2013 | Yucel | ................ | G01C 21/3469 703/8 |
| 2013/0103238 A1* | 4/2013 | Yu | ................ | G06F 17/00 701/22 |
| 2014/0229095 A1* | 8/2014 | Klimesch | ................ | B60R 16/0236 701/123 |
| 2015/0106001 A1* | 4/2015 | Lee | ................ | G01C 21/3469 701/123 |
| 2015/0134226 A1* | 5/2015 | Palmer | ................ | B60W 40/10 701/101 |
| 2015/0232097 A1* | 8/2015 | Luther | ................ | B61L 3/006 701/123 |

* cited by examiner

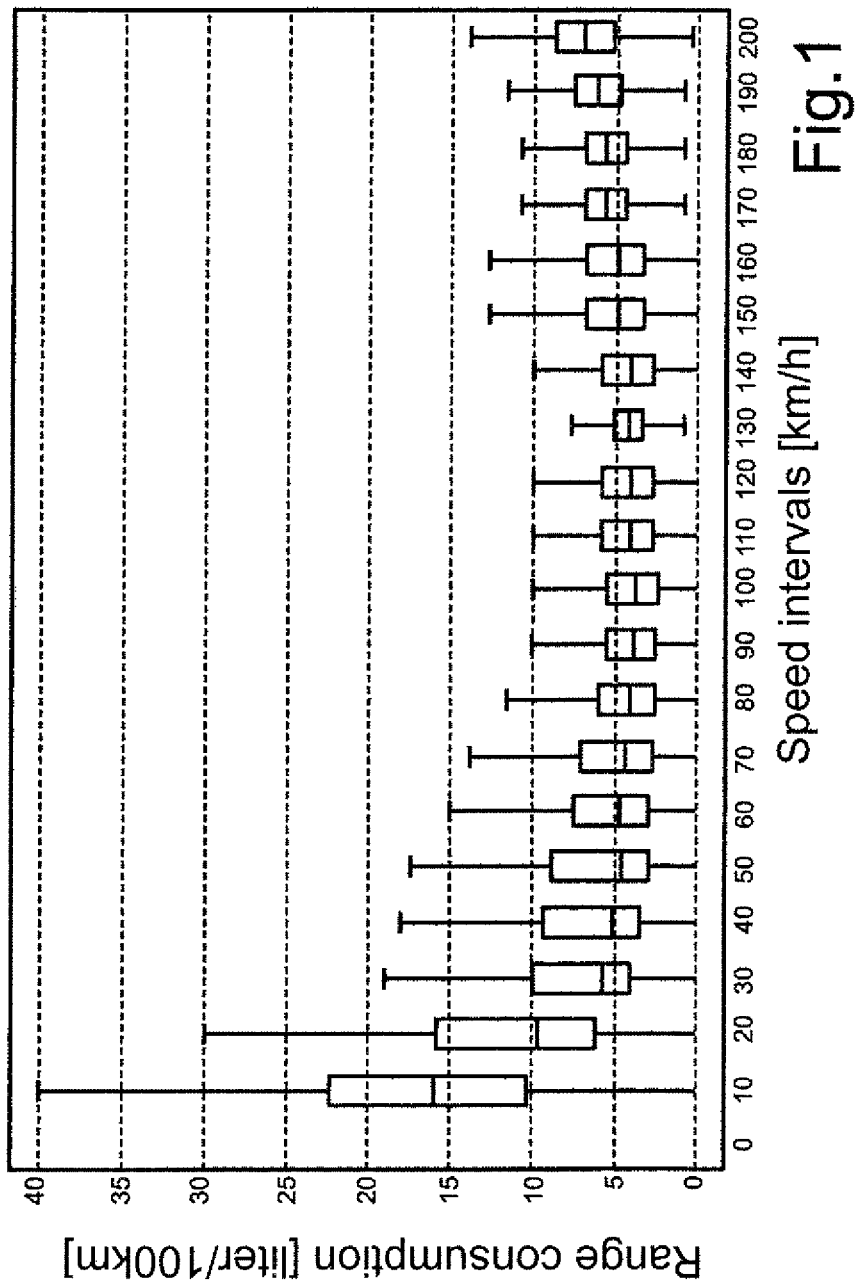

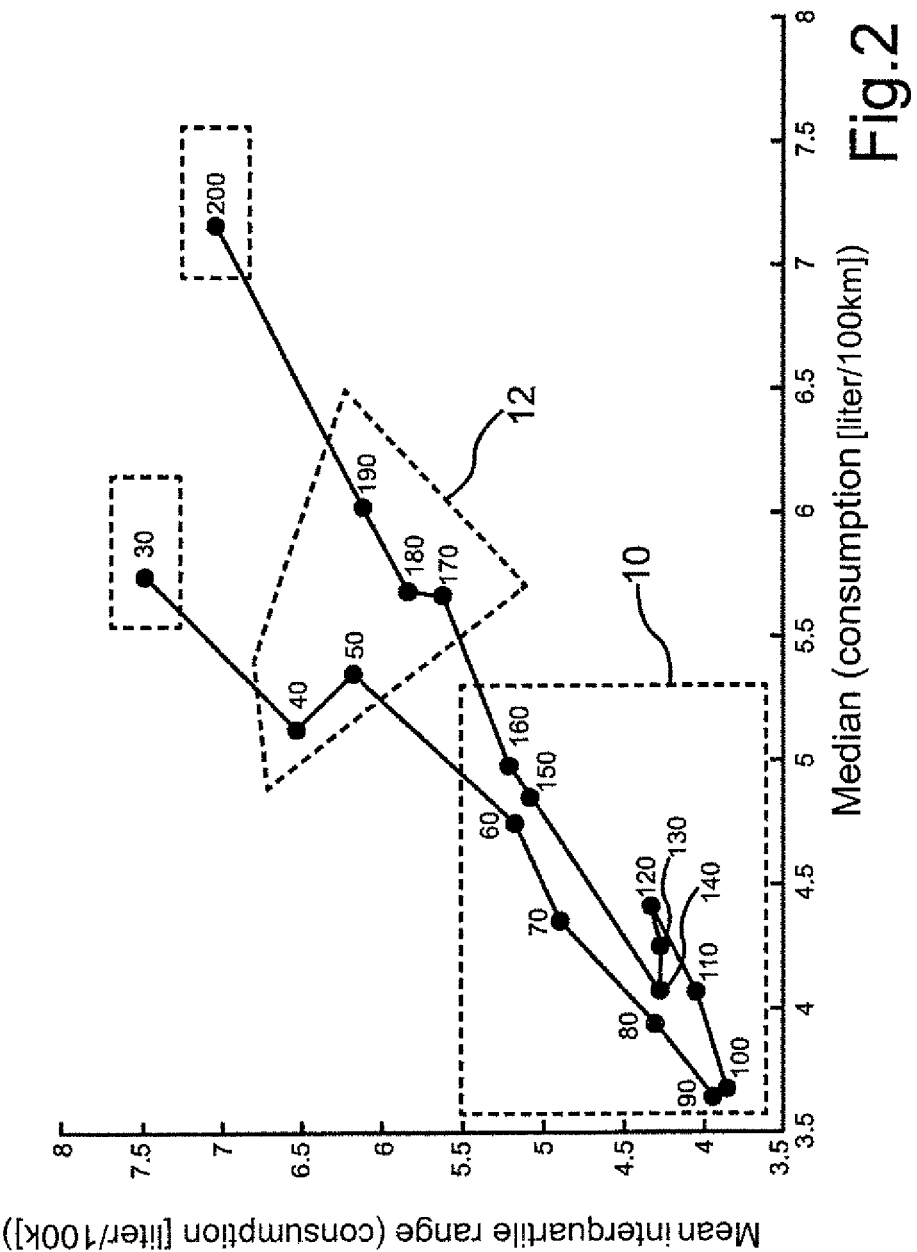

METHOD FOR DETERMINING AN EXPECTED CONSUMPTION VALUE OF A MOTOR VEHICLE

CROSS-REFERENCES TO RELATED APPLICATIONS

This application is the U.S. National Stage of International Application No. PCT/EP2013/000789, filed Mar. 14, 2013, which designated the United States and has been published as International Publication No. WO 2013/159853 and which claims the priority of German Patent Application, Serial No. 10 2012 008 688.1, filed Apr. 28, 2012, pursuant to 35 U.S.C. 119(a)-(d).

BACKGROUND OF THE INVENTION

The invention relates to a method for determining an expected consumption value of a motor vehicle.

To determine the maximum possible travel distance of a motor vehicle, the remaining amount of energy—i.e. the amount of fuel stored in a motor vehicle with an internal combustion engine and the energy stored in the battery of an electric motor vehicle—is usually divided by the route-specific consumption of the motor vehicle. Since the fuel consumption of motor vehicles varies greatly depending on the driving situation, it is not very practical to rely solely on the actually measured consumption value. Therefore, average consumption values are typically used for the calculation.

To enable a particularly accurate range determination, it is known to use driving-situation-dependent consumption values for calculating the potential driving range. For this purpose, the driving situation of the motor vehicle can be classified according to criteria such as driving speed, driven road category or the like, wherein a respective consumption value is assigned to each of those driving situations.

To further improve the accuracy of the range determination, it is also useful to determine consumption values specific for each motor vehicle, since the consumption can also be different between motor vehicles of the same model and/or engine configuration. To obtain such consumption values, for example the consumption history of the motor vehicle, categorized according to driving situations, can be stored and used for future range predictions.

The problem hereby ensures that different amounts of data are present depending on the driving behavior and the usage profile of the driver of a particular motor vehicle available for different driving situations. When a motor vehicle is used mainly in city traffic, a sufficient amount of historical consumption data may not exist that would apply, for example, to driving situations associated with cross-country trips so as to allow a statistically significant range determination in such driving situations.

SUMMARY OF THE INVENTION

It is therefore an object of the present invention to provide a method of the aforementioned type, which enables a particularly accurate range determination also for driving situations where only limited historical consumption values of the motor vehicle exist.

According to one aspect of the invention, a method for determining an expected consumption value of a motor vehicle for a predetermined driving situation includes the steps of:

a) acquiring and storing respective actual consumption values at each occurrence of the predetermined driving situation,
b) determining the expected consumption value on the basis of the stored consumption values,
c) checking whether the expected consumption value satisfies a predetermined significance criterion,
c1) if yes, using the expected consumption value for a range determination for the motor vehicle, or
c2) if no, determining an estimated value for the expected consumption and using the estimated value for the range determination for the motor vehicle.

In a method according to the invention for determining a consumption value of a motor vehicle for a predetermined driving situation, a database of historical consumption values is initially generated. For this purpose, the actual consumption of the motor vehicle is determined and stored at each occurrence of the driving situation.

To predict the consumption value of the motor vehicle in this situation, it is now checked whether the stored actual consumption values correspond to a given significance criterion—this can easily be determined, for example, based on the number of stored values. If this is the case, then the expected consumption value of the motor vehicle is determined for the given driving situation from the stored values. This can be done in the simplest case, for example, by averaging.

If the stored consumption values do not satisfy the given significance criterion, then the expected consumption value cannot be reliably predicted based on the stored values. To nevertheless enable a highly accurate range determination for the motor vehicle, an estimated value of the expected consumption is determined instead of the stored values, and the driving range of the motor vehicle in the given driving situation is calculated on that basis.

In this way, the consumption and thus the range assignment can also be particularly accurately determined even for driving situations for which no adequate data base of historical consumption values of the motor vehicle is available.

In another embodiment of the invention, the estimated value for the predetermined driving situation is determined from consumption values of at least one other motor vehicle. Although the consumption values of the at least one other motor vehicle are generally not exactly identical with those of the motor vehicle for which the determination is being made, an improved range determination can nevertheless be achieved in this manner.

It is particularly advantageous to use consumption of at least one other motor vehicle of the same type and/or the same engine configuration in order to obtain the most accurate estimates.

The consumption values may be exchanged wirelessly between the motor vehicle and a computing device. At the same time, the motor vehicle may transfer its own consumption values to the computing device so that a constantly updated database of consumption data for different vehicles can be made available.

In addition to using consumption data from other vehicles, it may also be advantageous to use the consumption of the own vehicle in a different driving situation. It has been observed that groups of driving situations with substantially identical consumption values exist. If no statistically significant data base is available for estimating the consumption for the current driving situation, data for a driving situation with a comparable consumption can be used so as to still obtain an accurate estimate of the consumption.

Advantageously, the other driving situation is selected based on a cluster analysis of all driving situations so that at least one distribution measure of the stored consumption values for the other driving situation matches the respective distribution measure of the stored consumption values for the given driving situation within a predetermined proximity measure. The cluster analysis may hereby be limited to stored data of the own vehicle; however, it is particularly useful to use fleet data. One such cluster analysis can be performed without prior knowledge of the actual grouping of the consumption values for all driving situations, so that groups of driving situations with an identical consumption profile can be reliably found.

Advantageously, a median and/or a mean interquartile range of the consumption values are used as a distribution measure. These distribution measures allow a reliable classification even with skewed distributions.

To enable the most accurate consumption estimate and thus range determination, it is also advantageous to characterize the driving situation according to a driving speed and/or a driven road category and/or an incline of the driven roadway and/or a traffic situation. Of course, other variables that have an impact on the consumption of the motor vehicle can also be included in the categorization of the driving situation.

The invention further relates to a device for carrying out the described method. This may be a corresponding control device, which is coupled via suitable bus systems with suitable memory units, sensors for determining quantities characterizing the driving situation and the actual consumption, communication equipment, navigation systems and the like.

BRIEF DESCRIPTION OF THE DRAWING

The invention and its embodiments will now be explained in detail with reference to the drawing, which shows in:

FIG. 1 a diagram illustrating median consumption values and mean interquartile ranges for a plurality of driving situations classified according to speed, and FIG. 2 the data shown in FIG. 1 as a scatter plot with a grouping of the driving situations into groups with comparable consumption values based on a cluster analysis.

DETAILED DESCRIPTION OF PREFERRED EMBODIMENTS

To analyze the consumption behavior of motor vehicles, a total of 15 million measurement points were recorded within the context of several test runs using different vehicle types. Each measurement point hereby corresponds to an instantaneous consumption value of the motor vehicle and is associated with the vehicle speed at the instant of the measurement. The driving speeds were hereby classified into intervals with a width of 10 km/h.

The figures show a statistical analysis of the measurements. In FIG. 1, the median consumption and the mean interquartile range is plotted in bar graph for each speed class. FIG. 2 shows the same data set, wherein for each speed class, a point was plotted in a scatter plot of the median consumption as a function of the mean interquartile range.

It is evident that several groups of speed classes exist, which are close in their consumption values. This is particularly evident in FIG. 2. The results from a statistical cluster analysis, which group speed classes with similar distribution measures for the consumption values, are plotted here in addition to the distribution measures of the raw data. A first cluster 10 hereby includes all speed classes from 60 to 160 km/h. Particularly prominent is a second cluster 12, which includes the speed classes 40 to 50 km/h and 170 to 190 km/h. Only the values for 30 km/h and 200 km/h are positioned in isolation.

This statistical grouping of the consumption values can be used for the range estimation of the motor vehicle. Particularly accurate range estimates can be made based on historical consumption data of the motor vehicle. In order to estimate the consumption of the motor vehicle in a current driving situation—as well as in a driving situation to be expected along a planned route—, stored values are relied upon that have occurred in previous trips for the same driving situation.

Depending on the usage profile of the motor vehicle, it may happen that sufficient historical consumption values are not available for certain driving situations so as to enable a statistically significant consumption estimate. For example, when a motor vehicle was mostly driven in city traffic, the data base of stored consumption values may potentially be inadequate for correctly predicting the consumption for highway driving. In this example, it can be inferred from the cluster analysis of FIG. 2 that the city traffic values in the speed classes from 40 to 50 km/h are statistically comparable to those of speed classes 170 to 190 km/h. The consumption of the motor vehicle in highway driving at more than 170 km/h can thus be predicted based on the values obtained in city traffic.

It will be understood that the classification of the driving situations is not limited to the illustrated exemplary speed classes. To allow more accurate consumption forecasts, additional parameters relevant for the fuel consumption of the motor vehicle can be included in the analysis. For example, it would be possible to take into account also geographic data, such as the incline of a route to be traveled, or traffic data, such information about current average speeds on a planned route, the traffic congestion situation on this route or the like.

The consumption and range forecast can be further improved through communication between individual motor vehicles and a central server. For example, measured consumption levels and consumption levels associated with specific driving situations of individual motor vehicles may be transmitted to the server where they are stored. When a motor vehicle requires usage information for a driving situation, for which no adequate data base is locally available in motor vehicle, these data can be requested again from the server and transmitted to the motor vehicle.

Overall, a method is provided which allows a particularly precise consumption forecast and thus also a particularly accurate range estimate for motor vehicles.

What is claimed is:

1. A method for determining an expected consumption value of a motor vehicle for a predetermined driving situation, comprising the steps of:
 a) acquiring and storing respective actual consumption values at each occurrence of the predetermined driving situation, wherein the predetermined driving situation is characterized with reference to at least one of a speed, a driven road category, an incline of a driven roadway and a traffic condition,
 b) checking based on the stored consumption values whether a statistically significant database for estimating a consumption exists for the predetermined driving situation, said statistically significant database defined by a median consumption and a mean interquartile range for each speed class,
b1) if yes, determining the expected median consumption and determining therefrom a driving range for the motor vehicle,
b2) if no, determining an estimated value for the expected consumption for the predetermined driving situation based on stored consumption values of the motor vehicle for another driving situation at a second speed belonging to a different non-overlapping second speed class having a median consumption that is comparable to the median consumption for the first speed class, wherein the interquartile ranges for the first and second speed class overlap,
substituting the expected consumption value of the motor vehicle traveling with the first speed of the first speed class with the median consumption of the second speed class, and
determining, from a remaining quantity of energy of the motor vehicle and the expected consumption value of the motor vehicle, the driving range of the motor vehicle.

2. The method of claim 1, wherein the consumption values of the at least one other motor vehicle are obtained from at least one other motor vehicle of identical type or identical engine configuration.

3. The method of claim 1, wherein the different driving situation is selected based on a cluster analysis across all encountered driving situations, so that at least one distribution measure of the stored consumption values of the different driving situation matches the respective distribution measure of the stored consumption values for the predetermined driving situation within the scope of a predetermined proximity measure.

4. The method of claim 3, wherein the at least one distribution measure is at least one of a median and a mean interquartile range of the stored consumption values.

5. An apparatus for determining an expected consumption value of a motor vehicle for a predetermined driving situation, comprising:

a sensor determining quantities characterizing an actual driving situation, wherein the quantities comprise at least one of a speed, a driven road category, an incline of a driven roadway and a traffic condition, and actual consumption values of the motor vehicle, and a memory unit, and a control device coupled to the sensor and the memory unit by way of a bus system, the control device configured to a) acquire and store in the memory unit respective actual consumption values at each occurrence of the predetermined driving situation, b) check based on the stored consumption values whether a statistically significant database for estimating a consumption exists for the predetermined driving situation, said statistically significant database defined by a median consumption and a mean interquartile range for each speed class, b1) if yes, determine the expected consumption value based on the stored consumption values and determining therefrom a driving range for the motor vehicle, b2) if no, determine an estimated value for the expected consumption for the predetermined driving situation based on stored consumption values of the motor vehicle at a second speed belonging to a different non-overlapping second speed class having a median consumption that is comparable to the median consumption for the first speed class, wherein the interquartile ranges for the first and second speed class overlap, and to substitute the expected consumption value of the motor vehicle traveling with the first speed of the first speed class with the median consumption of the second speed class, and to determine, from a remaining quantity of enemy of the motor vehicle and the expected consumption value of the motor vehicle, the driving range of the motor vehicle.

* * * * *